United States Patent Office 3,667,782
Patented June 6, 1972

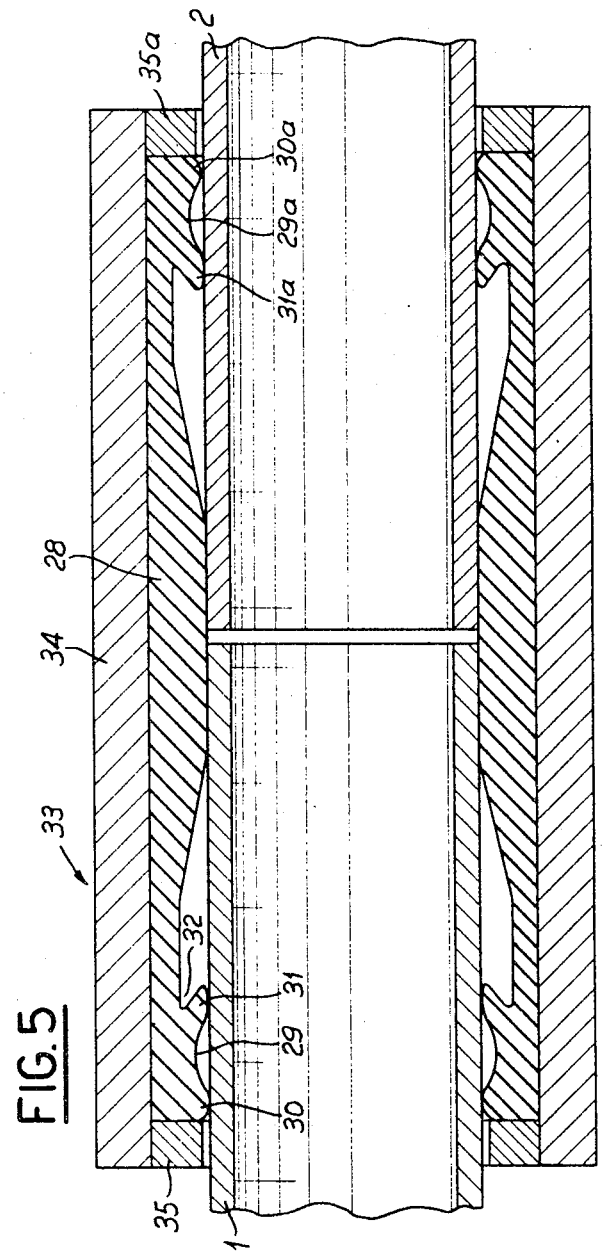

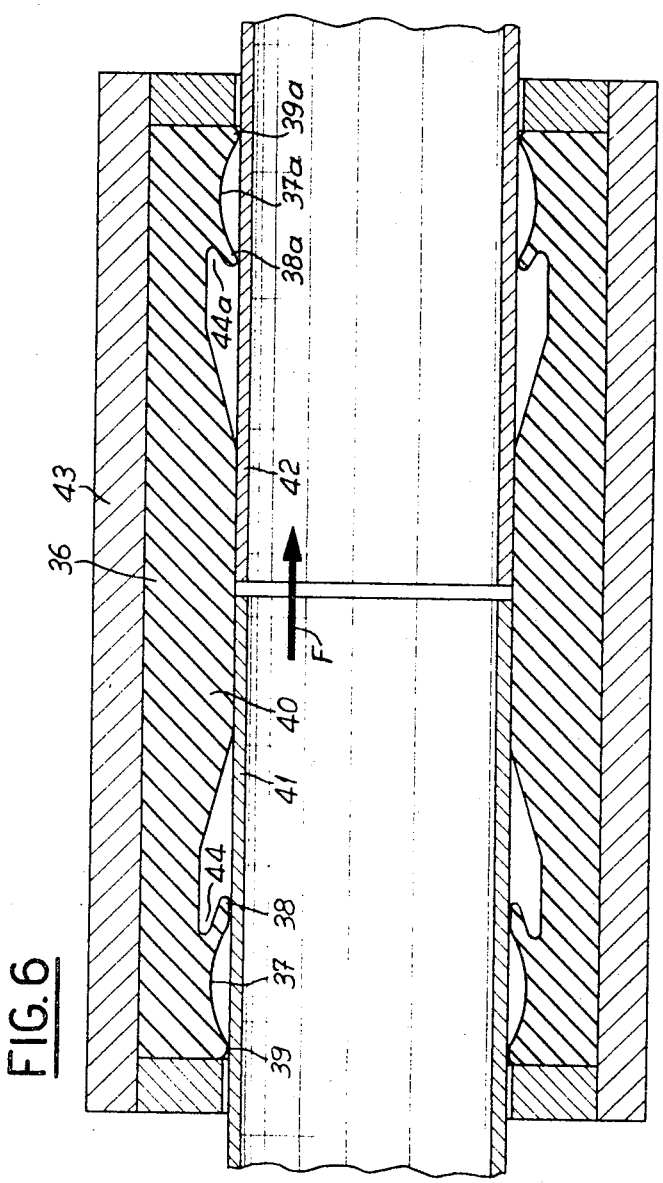

3,667,782
JOINTS FOR CONNECTING PIPES
Pierre Viazzi, Bormes-les-Mimosas, France, assignor to Societe Internationale d'Application de Procedes Industriels (S.I.A.P.I.) S.A., Panama, Republic of Panama
Filed Nov. 16, 1970, Ser. No. 89,877
Claims priority, application France, Dec. 3, 1969, 6941772; Apr. 21, 1970, 7014462; June 10, 1970, 7021340
Int. Cl. F16l 17/00
U.S. Cl. 285—110
12 Claims

ABSTRACT OF THE DISCLOSURE

The invention concerns a joint for connecting smooth-ended pipes and comprising a sleeve of resilient material fitted on the adjacent ends of two pipes. The sleeve has, at each of its ends, a circular throat, having, in longitudinal section, a concave portion bonded by two lips. The edges of these lips are located on circles of smaller diameter than the outside diameter of the pipes to be connected and are adapted to move into contact with and to be resiliently deformed by the outer surface of the pipes. The sleeve has further at its central zone a thickened portion having an inner cylindrical surface of circular cross-section having a diameter corresponding to the outside diameter of the pipes and adapted to move into contact with that part of the pipes extending on either side of the line at which the pipes meet.

---

The present invention relates to a joint for connecting pipes.

Pipes made of plastics material which offer advantages as regards their light weight and the cost of their production nevertheless have drawbacks as regards their fitting.

The joints at present in use for fitting pipes together in fact require a sleeving operation in the course of which the free end of one of the pipes is subjected to repeated impacts which have repercussions over the entire positioned run and cause cracks in the pipe and displacement of already fitted joints, particularly those involving the use of sleeves.

On the other hand, welding or otherwise bonding belled-end joints at the bottom of a trench is a delicate operation in soils consisting of powdery substances, because of the dust that is deposited on the end of the pipe that is inserted in the joint. The same situation occurs when the pipes are fitted in a trench made wet by bad weather.

Finally, joints made with the help of bonded sleeves or belled-end elements contain areas of reduced flexibility so that abnormal stresses occur in shifting ground.

The present joint enables these drawbacks to be eliminated and piping systems to be obtained that are of improved quality and the service life of which is greatly extended.

The present invention relates to a joint for joining smooth-ended pipes and comprising a sleeve of resilient material fitted on the adjacent ends of the two pipes, and is characterized in that the sleeve has at each of its ends a circular throat forming an air-hole having, in longitudinal section, a concave portion bounded by two lips, the edges of which are located on circles of smaller diameter than the outside diameter of the pipes to be connected, and are adapted to move into contact with and to be resiliently deformed by the outer surface of the pipes, and in that at its central zone this sleeve has a thickened portion having an inner cylindrical surface of circular cross-section having a diameter corresponding to the outside diameter of the pipes and adapted to move into contact with that part of the pipes extending on either side of the plane of the line at which the pipes meet.

This joint permits easy and rapid fitting as well as rapid replacement of a defective pipe by a sawing operation and refitting of the joints.

This joint which results in perfect continuity in the flow of water has a resilience such that the pipes can be moved relatively to each other without risk of splitting or leaking.

For the purpose of simplification and increased precision, the joint can be made without a clamping flange, and the only parts that may be modified are the case or the ferrule depending upon the type of pipe used and the pressures employed.

In accordance with a further feature of the invention, the resilient sleeve is fitted beforehand in a case so as to constitute a single composite element which is fitted on the ends of the pipes by sliding. The outer sleeve thus formed enables all flanged or clamping elements to be dispensed with and consequently avoids any strain on the piping systems particularly when made of plastics material, so that pipe-runs are obtained, the wall-thickness of which is more in keeping with the strength of the materials used. By reducing the wall-thickness of the pipe it is possible to make the material comprising the wall more homogeneous and consequently stronger, particularly in the case of large-diameter pipes.

This sleeve also enables expansion to be absorbed and mechanical shocks to be damped down in a line that has been laid.

In accordance with a further feature of the invention, appropriate dimensioning of the lips of the resilient joint enables the latter to be used as a safety valve in the event of excessive reduction in pressure or when mechanical shock occurs.

Other features and advantages of the invention will be better seen from the following description which relates to a number of forms of construction and which refers to the attached drawings in which:

FIG. 5 is a sectional view of a joint constituted by a composite element.

FIG. 6 is a sectional view of a resilient sleeve, the lips of which are different.

Figure 1:
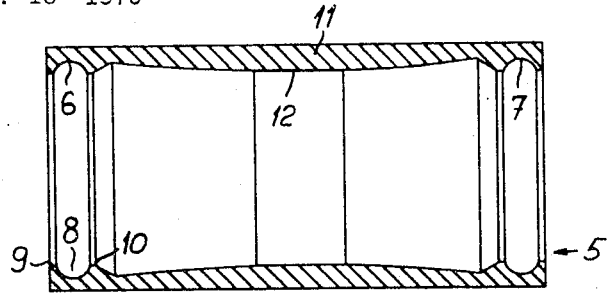
FIG. 1 is a sectional view of a joint sleeve prior to fitting.
Figure 2:
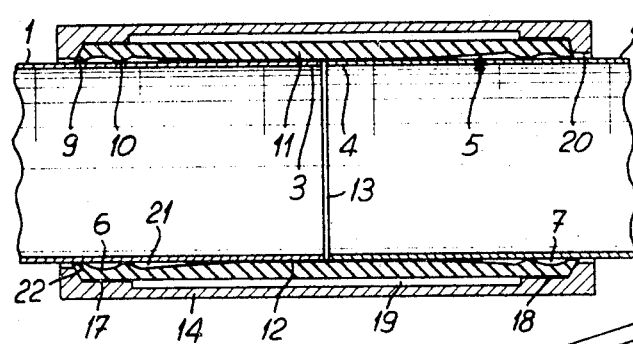
FIG. 2 is a sectional view of one form of construction of a joint as assembled.
Figure 3:
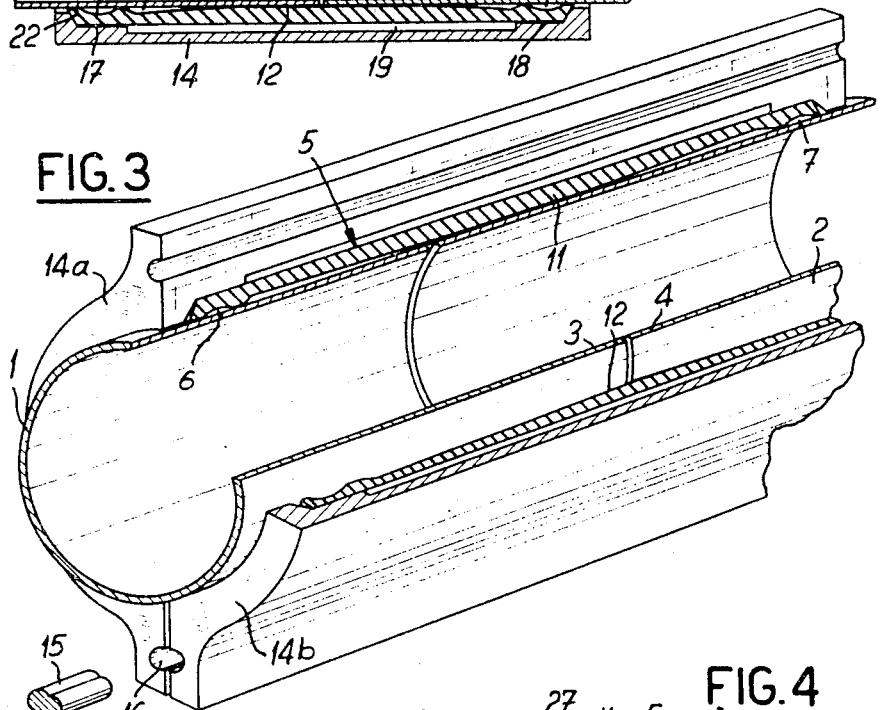
FIG. 3 is a perspective view of a form of construction of a joint.

FIGS. 1, 2 and 3 illustrate one form of construction of the joint used for fitting together two pipes 1 and 2. The adjacent smooth ends 3 and 4 of the pipes, arranged in abutting relationship, carry a sleeve 5 of resilient material, particularly rubber.

The sleeve 5 (FIG. 1) has at its two ends circular throats 6 and 7 which form air-holes and which are in contact with the outer walls of the pipes 1 and 2, said circular throats having, in section, a concave portion 8 bounded by lips 9 and 10 which are kept pressed against the walls of the pipes 1 and 2 (FIG. 2) by a fixing means to be described hereinafter.

These lips 9 and 10 thus have free edges which, when the joint is not mounted on a pipe, are of circular form having a diameter less than the outside diameter of the pipe to be connected. Thus, when the sleeve is in the working position on the pipes, these lips 9 and 10 are resiliently deformed and are applied to the outside walls of the pipes.

In its central zone, the sleeve 9 has a thickened portion 11 which is in contact, by way of a planar portion 12, with the portions 3 and 4 of the pipes extending on either side of the line 13 at which the pipes meet.

This thickened portion has an inner cylindrical surface of circular cross-section, the diameter of which corresponds to the outside diameter of the pipes to be connected. In the working position, this central zone is in contact with the outer surface of the two pipes 1 and 2 arranged in abutting relationship.

Around the sleeve 5 there is fitted a protective case 14 constituted by two halves 14a and 14b of semi-circular cross-section which are interconnected by locking means such as pegs 15 fitted in seatings 16 formed in the halves of the case.

At each end the case 14 has a shoulder 17 and 18 against which are clamped the ends of the sleeve 15 comprising the throats 6 and 7, the arrangement being such that the lips 9 and 10 are resiliently deformed and are in firm contact with the surface of the pipes.

As can be seen from FIGS. 2 and 3, the sleeve 5 is in contact with the pipes through its ends 6 and 7 and through the thickened portion 11 at the central zone. The central zone of the sleeve 5 can however deform resiliently under the action of liquid under pressure escaping at the meeting point 13 of the pipes, a space 19 being present between the wall of the sleeve 5 and the inner wall of the case 14 to accommodate the resiliently deformed material of the sleeve.

Also, an annular space 20 is formed between the ends of the case 24 and the pipes 1 and 2 so as to enable the pipes to be easily displaced relatively to the case, a seal being provided by the lips 10 of the throats 6 and 7, so that any liquid, flowing through the gap at 13 into the space 21 between the pipe 1 and the sleeve 5, cannot escape beyond the lips 10.

An annular space 22 is provided at the ends of the case 14 to permit unrestricted expansion of the lip 9 of the sleeve 5.

Figure 4:
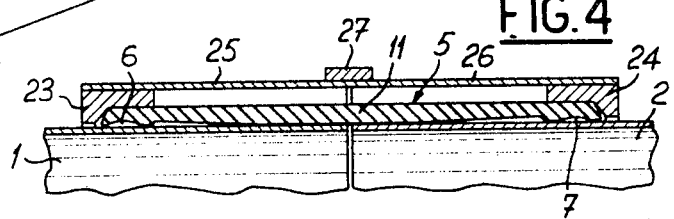
FIG. 4 is a sectional view of another form of construction of a joint as assembled.

The case 14 can be replaced by two collars 23 and 24 (FIG. 4) which clamp the ends of the sleeve 5 comprising the throats 6 and 7 in order to keep the lips 9 and 10 against the wall of the pipes in the manner previously described.

These clamping collars 23 and 24 can be constituted by a single element or a plurality of elements.

Also, the two collars 23 and 24 can be integral with the two protective sleeves 25 and 26 respectively, which are made of rigid material and fitted around the resilient sleeve 5, said protective sleeves being connected at the central portion of the joint by a fixing collar 27.

FIG. 5 illustrates a further form of construction of the sleeve fitted on the adjacent ends of two pipes 1 and 2.

This joint comprises a sleeve 28 made of resilient material which has at each of its two ends a circular throat 29 and 29a respectively which form air-holes and are bounded by outer lips 30 and 30a and inner lips 31 and 31a which bear in a resilient manner against the pipes 1 and 2. In this form of construction the inner lips 31 and 31a have a greater length than the outer lips so that a cavity 32 is provided between each lip 31 and 31a and the wall of the sleeve 28.

The throats 29 and 29a forming air-holes at the ends of the sleeve result in a tight seal at zero pressure and even negative pressure when the joint is fitted on the pipes.

The outer lips 30 and 30a easily slide over the pipe and provide a first air-seal, causing the pressure in the air-hole to be reduced. This reduction in pressure takes place when the pipe reaches the lower lips 31 and 31a thus increasing the volume of the air-hole. This resilient sleeve 28 is fitted beforehand in a case 33 so as to form a single composite element which is slid on to the ends of the pipes 1 and 2.

The case 33 is made of a tubular element 34 to which are attached, particularly by welding, rings 35 and 35a constituting shoulders for enclosing the resilient sleeve 28. The tubular element 34 and the rings 35 and 35a can be made in plastics material or in metal. The case 33 can also be a one-piece plastics moulding.

The joint illustrated in FIG. 6 comprises a resilient sleeve 36 which has at its two ends circular throats 37 and 37a which form air-holes and are bounded by inner lips 38 and 38a and by outer lips 39 and 39a adapted to be applied in a resilient manner against the walls of the pipes, the central zone of the sleeve comprising a thickened portion 40 in contact with the pipes 41 and 42.

This sleeve is fitted in a case 43 which provides it with exterior protection.

The inner lips 38 and 38a have a greater length than the outer lips 39 and 39a, and a cavity 44 and 44a is formed between each lip 38 and 38a and the wall of the sleeve 36.

The direction of flow of the fluid is indicated by the arrow F, and the inner lip 38a situated downstream is shorter than the lip 38 situated upstream, so that the cavity 34a is shorter than the cavity 44.

This interior upstream lip 38a can be of the same length as the outer lip 39a. The lip 38a being shorter than the lip 38 however, it can turn towards the throat 37a when excess pressure occurs, so that the surplus pressure can be relaxed.

The lip 38a then returns to its initial position because of its inherent resilience and thus again ensures a seal against normal operating pressure.

This arrangement enables the sleeve 36 to be used as a safety valve in the event of mechanical shock or excess pressure.

The throats 37 and 37a at the end of the sleeve and forming air-holes press against the walls of the pipes when the joint is fitted in position and thus avoid all stress on the pipes of plastics material.

On the other hand, these throats also provide a good seal under zero pressure and even negative pressure.

The exterior lips 39 and 39a easily slide over the pipe and provide a first air-seal which enables the pressure in the air-holes to be reduced.

This reduction in pressure takes place when the pipe reaches the inner lips 38 and 38a thus increasing the volume of the air chamber.

The pipe thus gripped but not subjected to stress is fitted to a joint that can be bent at an angle. The thickened portion 40 at the central zone of the sleeve 36 provides a seal at zero pressure, and its length is a function of the expansion of the pipes to be connected; the resilience of the material permits the pipes to move out of alignment without the risk of breakdown of the seal.

It will be useful to indicate, by way of example, the dimensions of a joint in relation to the outside diameter of the pipe with which it is to be used.

|  | Mm. |
|---|---|
| Outside diameter of pipe | 90 |
| Inside diameter of the lips 9 and 10 | 84 |
| Insdie diameter of air-hole | 93 |
| Inside diameter of central zone of sleeve | 90 |
| Inner length of throat | 11 |
| Length of central portion | 25 |
| Length of air-hole | 11 |
| Length of sleeve | 75 |
| Total length of joint | 135 |

It is obvious that a joint having dimensions suited to those of the pipe can be provided for each diameter of pipe.

The rubber of which the joint is made can be a neoprene having the following properties:

Hardness in Shore units: 43 maximum, and elongation between 540 and 760%.

An example of the composition of the material of a joint for use with PVC piping is as follows:

| | Parts by weight |
|---|---|
| Neoprene W.K. | 100 |
| Light magnesia | 4 |
| Zalba | 2 |
| Héliozone | 2 |
| Paraffin | 1 |
| Stiaric acid | 1 |
| M.T. black | 60 |
| Sundex | 30 |
| Z.N.O. | 5 |
| N.A. 22 | 0.5 |

The mechanical properties and the chemical composition can be varied in accordance with the materials of the pipes to be connected; in the case of a heavy material the Shore hardness should be increased and this automatically means a change in the composition and a change in the vulcanization time.

The ferrule fitted on a rubber sleeve and forming therewith a composite element of the joint can be made by one of the following methods:

(1) A length of tube of the same diameter of the pipes to be connected is expanded until it reaches the same outside diameter as the rubber sleeve, and two rings are bonded to its ends to prevent the rubber from being squeezed out.

(2) A length of tube the same diameter of the pipes to be connected is expanded to the same outside diameter as the rubber sleeve, and the edges of each end are turned over to form the necessary surfaces for the rubber sleeve to bear against.

(3) The tubes could also be extruded to the outside diameter of the rubber sleeve; to make the joint, the only operations then required would be to bond the end rings, or to turn over the edges and to fit the rubber sleeve to form the composite element of the joints.

It will be understood that various modifications to the arrangements and methods described above by way of non-limiting examples only can be made by the person skilled in the art, which modifications would still be within the scope of the invention.

I claim:

1. A joint for connecting smooth-ended pipes and comprising a sleeve of resilient material fitted on the adjacent ends of two pipes, characterized in that the sleeve has, at each of its ends, a circular throat, having, in longitudinal section, a concave portion bounded by two lips, the edges of which are located on circles of smaller diameter than the outside diameter of the pipes to be connected and are adapted to move into contact with and to be resiliently deformed by the outer surface of the pipes, and in that the sleeve has at its central zone a portion of a thickness greater than the thickness of the sleeve adjacent said lips, said portion having an inner cylindrical surface of circular cross-section having a diameter corresponding to the outside diameter of the pipes and adapted to contact the outer surface of the pipes on either side of the line at which the pipes meet.

2. A joint according to claim 1, characterized in that it comprises strapping elements which hold each end of the sleeve, containing a circular throat, clamped on to the pipe.

3. A joint according to claim 2, characterized in that the strapping elements are connected by a protective sleeve fitted around the resilient sleeve.

4. A joint according to claim 1, characterized in that the resilient sleeve is surrounded by a case constituted by two halves of semi-circular cross-section interconnected by locking means, said case having at its two ends shoulders against which abut the ends of the sleeve containing the circular throats.

5. A joint according to claim 1 characterized in that two clamping collars are fitted at the ends of the resilient sleeve.

6. A joint according to claim 1, characterized in that the resilient sleeve is fitted in a case to form a single composite element which is adapted to be slid on to the ends of the pipes to be connected.

7. A joint according to claim 6, characterized in that the case is constituted by a tubular element made of polyvinyl chloride, at each end of which is welded a ring.

8. A joint according to claim 6, characterized in that the case is made of moulded plastics material.

9. A joint according to claim 6, characterized in that the case is constituted by a metallic tubular element at each of the ends of which is welded a ring.

10. A joint according to claim 6, characterized in that the resilient sleeve has an outer wrapping of adhesive fabric.

11. A joint according to claim 1 characterized in that the lips extended towards the interior of the sleeve have a greater length than the outer lips so that a cavity is formed between each inner lip and the wall of the sleeve.

12. A joint according to claim 1, characterized in that the sleeve has dimensions corresponding to those of the pipes to be joined so that it can be fitted on the pipes in such manner as to clamp them without compressing them.

References Cited

UNITED STATES PATENTS

| | | | |
|---|---|---|---|
| 2,985,435 | 5/1961 | Gross | 285—373 X |
| 3,186,744 | 6/1965 | Smith et al. | 285—373 |
| 3,334,928 | 8/1967 | Schmunk | 285—110 |
| 3,479,066 | 11/1969 | Gittlemun | 285—236 |
| 3,558,164 | 1/1971 | Hovell | 285—236 |

FOREIGN PATENTS

| | | | |
|---|---|---|---|
| 925,743 | 3/1955 | Germany | 285—236 |
| 98,794 | 10/1961 | Norway | 285—235 |

DAVE W. AROLA, Primary Examiner

U.S. Cl. X.R.
285—345, 369, 373